United States Patent [19]

Miyashita et al.

[11] Patent Number: 4,780,802
[45] Date of Patent: Oct. 25, 1988

[54] CONTROL CIRCUIT FOR REMOVING RIPPLE OF DIRECT CURRENT SUPPLY SYSTEM FOR VOLTAGE SOURCE INVERTER

[75] Inventors: Takeshi Miyashita; Takao Kawabata, both of Hyogo, Japan

[73] Assignee: Mitsubishi Denki Kabushiki Kaisha, Tokyo, Japan

[21] Appl. No.: 30,596

[22] Filed: Mar. 27, 1987

[30] Foreign Application Priority Data

Mar. 28, 1986 [JP] Japan ................................. 61-71465

[51] Int. Cl.⁴ ............................................ H02M 5/45
[52] U.S. Cl. ...................................... 363/37; 363/88; 363/86
[58] Field of Search ....................... 363/37, 86, 88, 128

[56] References Cited

U.S. PATENT DOCUMENTS

| | | | |
|---|---|---|---|
| 4,158,163 | 6/1979 | Eriksen et al. ................... | 363/37 X |
| 4,315,305 | 2/1982 | Siemon ................... | 363/88 |
| 4,517,634 | 5/1985 | Sakai ................... | 363/37 X |
| 4,545,002 | 10/1985 | Walker ................... | 363/37 |

OTHER PUBLICATIONS

Nippon Denchi K. K. (Japan Battery Co., Ltd.), "Technical Reference on GS CA Type Thyristor Rectifier", Oct. 10, 1982, pp. 8 & 9.

Primary Examiner—Patrick R. Salce
Assistant Examiner—Marc S. Hoff
Attorney, Agent, or Firm—Bernard, Rothwell & Brown

[57] ABSTRACT

The present invention relates to a power source apparatus for supplying a stabilized D.C. output to an inverter. In a D.C. power source apparatus for an inverter comprising a forward power conversion circuit receiving commercial A.C. power supply for outputting D.C. power such as a thyristor rectifying circuit and control circuit for controlling the D.C. output voltage of said forward power conversion circuit, the disclosed D.C. power source apparatus for an inverter is provided with feedforward control circuit detecting the D.C. input current to the inverter. The D.C. current input to the inverter or a current equivalent thereto is detected by the feedforward control circuit as a detection signal, and based on this detection signal, an A.C. component virtually in phase with the A.C. component input to the inverter is output from the forward power conversion circuit, and thereby, the D.C. voltage ripple to the inverter is decreased.

11 Claims, 7 Drawing Sheets

CONTROL CIRCUIT FOR REMOVING RIPPLE OF DIRECT CURRENT SUPPLY SYSTEM FOR VOLTAGE SOURCE INVERTER

BACKGROUND OF THE INVENTION

1. Field of the Invention

The present invention relates to a D.C. (direct current) power supply apparatus for supplying D.C. power to an inverter which converts D.C. power into A.C. (alternating current) power and more particularly relates to improvement of a D.C. power supply apparatus formed of, for example, a thyristor converter, chopper circuit, high power factor converter, or the like.

2. Description of the Prior Art

For supplying the load side with A.C. power of stabilized frequency and voltage characteristics, an inverter for converting D.C. power into A.C. power is generally used. The D.C. power supply apparatus for the inverter is provided on the input side of the inverter to supply a stabilized D.C. output to the inverter.

Those so far most widely used as such D.C. power supply apparatus for inverters are thyristor type rectifier apparatus (thyristor rectifiers), and as an example of the same, there is known the CA type rectifier disclosed in "Technical Reference on GS CA type Thyristor Rectifier", on pages 8 to 9, distributed by Nippon Denchi K.K. (Japan Battery Co., Ltd.).

The conventional D.C. power supply apparatus was, as shown in FIG. 1, made up of a thyristor rectifier circuit as a forward conversion apparatus converting A.C. power into D.C. power of which voltage (current) is controlled at the same time, such as, for example, a thyristor rectifier 1 of the above mentioned CA type, a D.C. reactor 2 provided on the output side of the thyristor rectifier 1 for smoothing the pulsating component in the D.C. current of the output of the thyristor rectifier 1, a storage battery 3 connected in parallel between the D.C. reactor 2 and an inverter as a reverse conversion apparatus (not shown), a voltage detector 4 for detecting the output voltage of the thyristor rectifier 1, a current detector 5 for detecting the output current of the thyristor rectifier 1, an upper limit value of output current generation circuit 6 for generating the upper limit of the output current of the thyristor rectifier 1, a current drooping control circuit 7 in response to the detected signal by the current detector 5 and the set signal by the upper limit value of output current generation circuit 6 for controlling the output current of the thyristor rectifier 1 so that it may not exceed the upper limit, a reference voltage generation circuit 8 for generating the reference value of the output voltage of the thyristor rectifier 1, an output voltage control circuit 9 in response to the outputs of the voltage detector 4, current drooping control circuit 7, and the reference voltage generation circuit 8 for controlling the output voltage of the thyristor rectifier 1 so that it may be held constant, and a gate pulse generation circuit 10 in response to the output of the output voltage control circuit 9 for outputting a predetermined gate pulse.

Operations of the same will be described below. The output voltage and current of the thyristor rectifier 1 converting input A.C. power into D.C. power are detected by their respective detectors 4 and 5 after being smoothed by the D.C. reactor 2. Then, the output voltage control circuit 9 compares the detected voltage value from the voltage detector 4 with the reference value from the reference output voltage generation circuit 8 and sends a signal to the gate pulse generating circuit 10 so that the detected voltage and the reference voltage may become equal.

Meanwhile, the current drooping control circuit 7 applies a signal to the output voltage control circuit 9 so that the output current may be reduced when the detected current value exceeds the reference value from the upper limit value of output current generation circuit 6.

Then, the gate pulse generating circuit 10 generates a gate pulse whose phase is controlled by the same in response to the signal from the output voltage control circuit 9. This gate pulse is applied to the thyristor rectifier 1, whereby the output voltage of the thyristor rectifier 1 is held constant and the output current thereof is maintained below the upper limit value.

In the event of a power failure, the D.C. voltage is supplied from the storage battery 3.

Since the prior art D.C. power supply apparatus for an inverter was constructed as described above, there were problems with the same when applied to a power souce of an inverter for uninterruptible equipment or the like as follows.

(1) Since the D.C. input current to an inverter contains a ripple corresponding to the output current thereof, a so-called electrolytic capacitor is generally used as a smoothing capacitor for passing the ripple current therethrough. But, since the so-called electrolytic capacitor has a short life of only 7–8 years, it has to be replaced rather frequently and this requires much labor and cost.

(2) In the case where a so-called film capacitor is used instead of the so-called electrolytic capacitor, the capacity becomes 1/10 or less in view of the economy achievable and the space occupied thereby, and thus, the ripple in the D.C. voltage becomes larger. Therefore, when the uniterruptible power equipment is provided with a battery connected in parallel, this current ripple to the inverter flows into the battery causing a temperature rise therein or deterioration in its durability.

(3) In the case where the inverter is a single-phase inverter, or a three-phase inverter with an unbalanced load, the ripple in the D.C. current input to the inverter becomes much larger than in case of a three-phase inverter with a balanced load, and the frequency of the ripple becomes 2f. In such a case, if a film capacitor is used, because of its capacitance becoming 1/10 or less, the ripple naturally becomes larger. Therefore, in order not to allow the excessive current to flow into the battery, the capacitance of the film capacitor has to be made larger by the sacrifice of economy or a reactor has to be provided in series with the battery, and this makes the circuit complex.

(4) In a voltage type inverter, it is ideal in principle that D.C. power is supplied from a D.C. power source of a low impedance. But, in the case where the film capacitor is used instead of the electrolytic capacitor, the impedance of the D.C. power source becomes higher, and the impedance seen from the output side also becomes higher, and therefore, the regulation of the inverter becomes larger. Specifically, it is a problem with the three-phase inverter that its voltage unbalance becomes larger when connected with an unbalanced load.

SUMMARY OF THE INVENTION

The present invention has been made to solve the above described problems and therefore has the objects as mentioned below.

An object of the present invention is the provision of a D.C. power supply apparatus for an inverter, that is, a forward power conversion apparatus such as a thyristor rectifying circuit to be provided on the input side of an inverter, wherein the output current thereof is adapted to be controlled according to pulsation in the input current to the inverter so that the ripple contained in the D.C. voltage of the smoothing capacitor may be reduced making it possible to exchange the so-called electrolytic capacitor a the smoothing capacitor connected in parallel with the D.C. circuit for another long-life, low-cost capacitor, and thus, improvement of efficiency in maintenance work and lowering of maintenance cost will be achieved.

Another object of the present invention is the provision of a D.C. power supply apparatus for an inverter, in which, by virtue of the above mentioned capability of the controlling to reduce the ripple contained in the D.C. voltage of the smoothing capacitor, the ripple current in the D.C. circuit is prevented from flowing into, for example, the battery of an uninterruptible power equipment even if the capacitance of the smoothing capacitor is reduced to 1/10 or less of that hitherto in use, and therefore, the battery or the like will not be deteriorated or damaged by a temperature rise.

A further object of the present invention is the provision of a D.C. power supply apparatus for an inverter, in which, by virtue of achievement of the above two objects, that is, reduction in the ripple contained in the D.C. voltage and the prevention of deterioration of the battery as a consequence of the reduction in the ripple, the circuit configuration will be simplified by eliminating the need for increasing the capacitance of the smoothing capacitor, connection of a series reactor to the battery or the like of an uninterruptible power equipment, etc.

Yet another object of the present invention is the provision of a D.C. power supply apparatus for an inverter, in which, the impedance of D.C. power source is prevented from increasing even if a low-cost, small-capacitance capacitor, such as a so-called film capacitor, is used as the smoothing capacitor, and specifically, when applied to a three-phase inverter connected with an unbalanced load, production of the voltage unbalance is prevented from occurring.

In order to achieve the above mentioned objects at a stroke, the D.C. power supply apparatus for an inverter according to the present invention is adapted such that an A.C. component, that is, a ripple component virtually in phase with the A.C. component (ripple component) contained in the D.C. current input to the inverter is provided from the power rectifier by detecting the D.C. current input to the inverter or a signal equivalent thereto and supplying the detected signal to an output voltage control apparatus of the forward power conversion apparatus as a feedforward signal.

DETAILED DESCRIPTION OF THE PREFERRED EMBODIMENTS

Some of preferred embodiments of the D.C. power supply apparatus for an inverter according to the present invention will be described with reference to the accompanying drawings.

Figure 1:
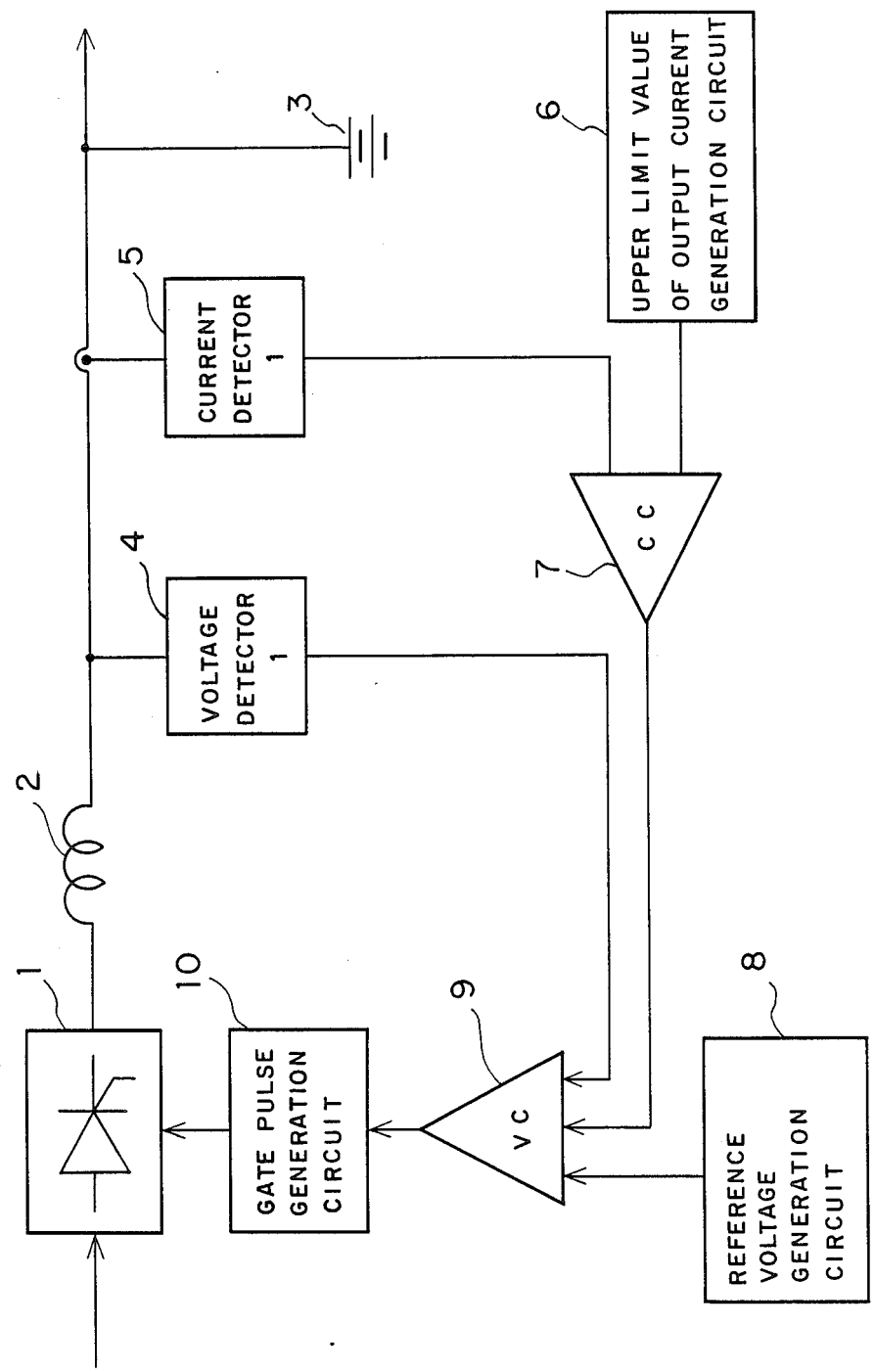
FIG. 1 is a block diagram showing an example of a thyristor type rectifier apparatus as a D.C. power supply apparatus for an inverter of the prior art.
Figure 2:
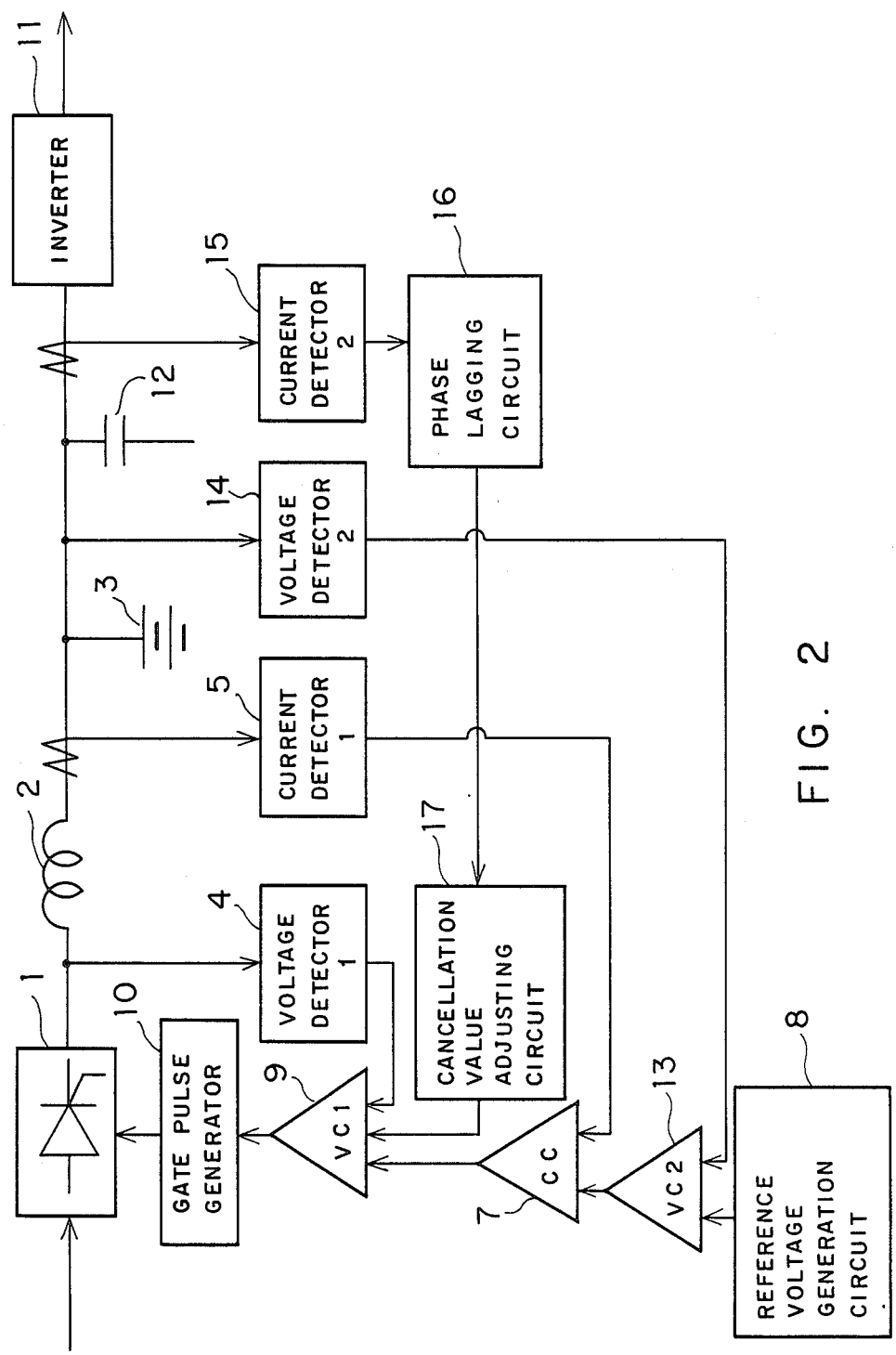
FIG. 2 is a block diagram showing the overall construction of a first embodiment of the D.C. power supply apparatus for an inverter according to the present invention, in which interconnections among a forward power conversion apparatus using a thyristor rectifier, an output voltage control circuit for the same, an inverter, and a feedforward control circuit are indicated.
Figure 3:
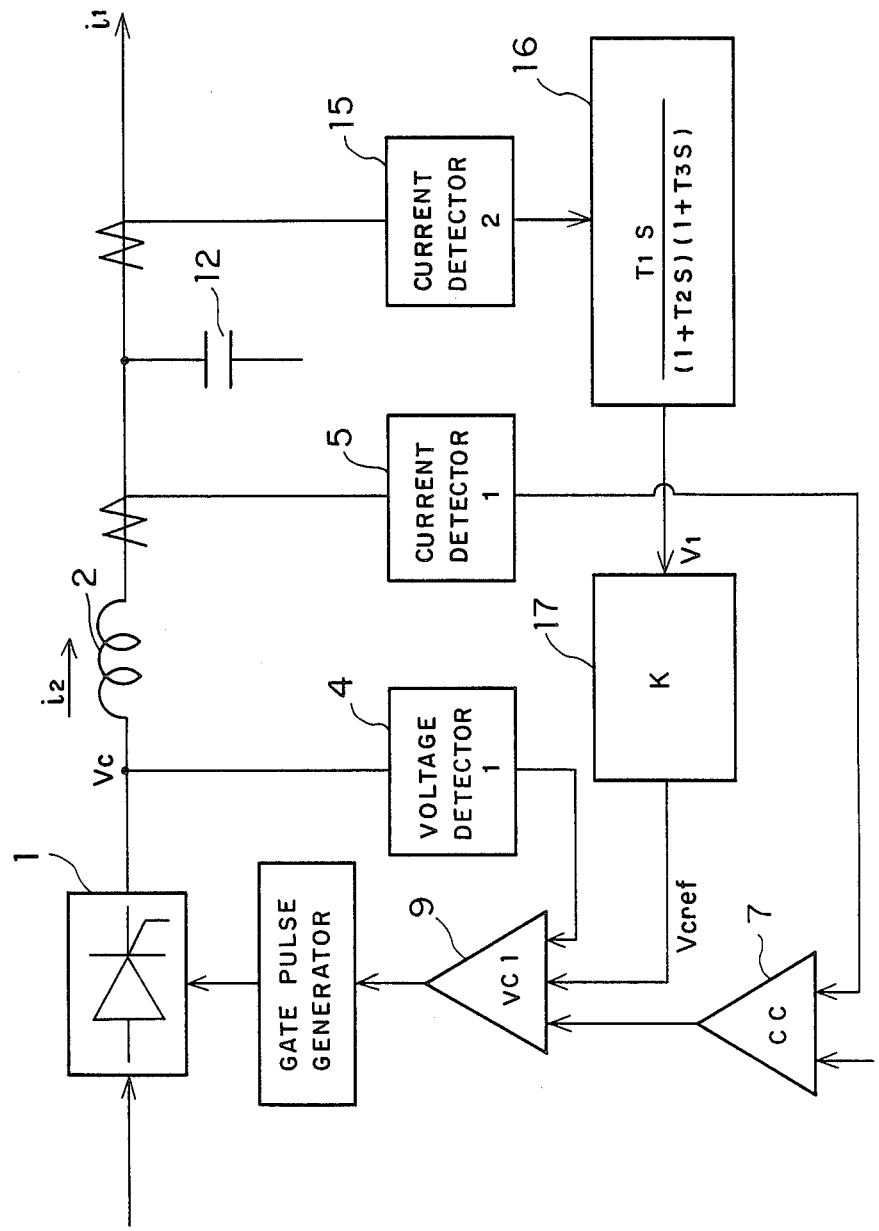
FIG. 3 is a block diagram showing a control system in the D.C. power supply apparatus for an inverter of FIG. 2, made up of the output voltage control circuit for the forward power conversion apparatus and the feedforward control circuit.

FIGS. 2 to 5 are for describing the first embodiment of the present invention. In FIGS. 2 and 3, reference numerals corresponding to those denoting parts in the prior art apparatus in FIG. 1 denote the same or corresponding parts and repeated description of the same is omitted here.

Referring to FIG. 2, an inverter 11 is connected to the output side of a forward power conversion apparatus made up of a thyristor rectifier 1, a D.C. reactor 2, etc., and a smoothing capacitor 12 is connected to the input side of the inverter 11 in parallel. Between the points to which the capacitor 12 and the battery 3 are connected, there is connected in parallel a second voltage detector 14 for detecting the voltage on the input side of the inverter 11 and issuing the detected signal to a second voltage control circuit 13 responding to an output of the reference voltage generation circuit 8 for controlling the input voltage to the inverter 11. Between the capacitor 12 and the inverter 11, a second current detector 15 is provided, and to this second current detector 15 is connected a phase lagging circuit 16 as a filter circuit for delaying the phase, and, to this phase lagging circuit 16 is connected a cancellation value adjusting circuit 17 for delivering an output to the first voltage control circuit 9. The second current detector 15, phase lagging circuit 16, and the cancellation value adjusting circuit 17 constitute a feedforward control system controlling the output of the forward power conversion apparatus formed of the thyristor rectifier 1, based on the input current to the inverter 11 by way of the first voltage control circuit 9 and the gate pulse generator 10.

A reference value from the reference voltage generation circuit 8 and the input voltage to the inverter 11 detected by the second voltage detector 14 are supplied to the second voltage control circuit 13, and thereby, the input voltage to the inverter 11 is controlled so as to be held constant, and the output thereof as a command current value is given, together with the detected value of the D.C. current by the current detector 5, to the current control circuit 7 for controlling the D.C. current.

The output of the current control circuit 7 is applied, together with the detected value of the input current to the inverter 11 which has been passed through the phase lagging circuit 16 and the cancellation value adjusting circuit 17, to the first voltage control circuit 9 for controlling the output of the thyristor rectifier 1, whereby the phase of the gate pulse generator 10 is controlled so that the output voltage of the thyristor rectifier 1 may be controlled.

Figure 4:
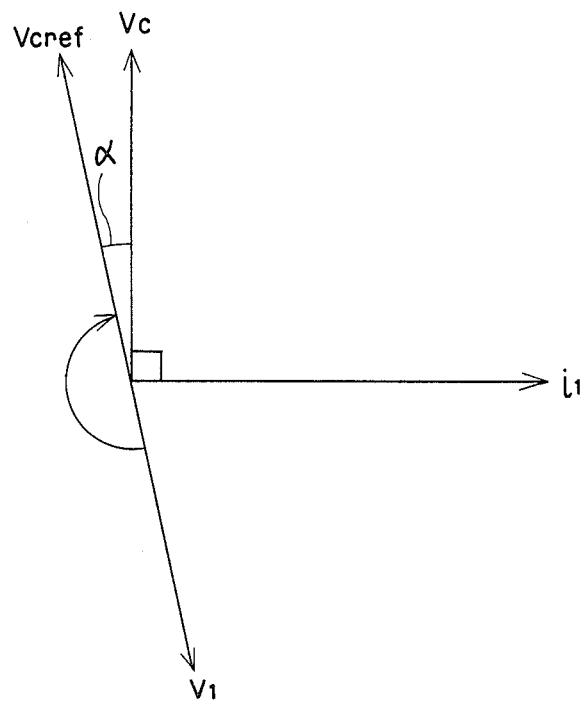
FIG. 4 is a vector diagram showing a phasic relation between the input current to the inverter and the D.C. output of the forward power conversion apparatus in the embodiment of FIG. 2.

In the present case, as shown in FIG. 4, the input current $i_1$ (detection value) to the inverter 11 detected by the second current detector 15 is converted to a signal $v_1$ through the phase lagging circuit 16 having a transfer function as shown in FIG. 3, and turned into a signal $v_{cref}$ by inversion. The signal $v_{cref}$ is subjected to the gain adjustment by the cancellation value adjusting circuit 17 and supplied to the first voltage control circuit 9 for controlling the output voltage of the thyristor rectifier 1, and thereby, $v_c$ which is advanced by 90° in its phase from the input current $i_1$, necessary for passing the input current $i_1$, is generated. Considering as an example a case where the inverter 11 is a single inverter of 60 Hz output, the lowest harmonic component in the input current is that of 120 Hz.

Figure 5:
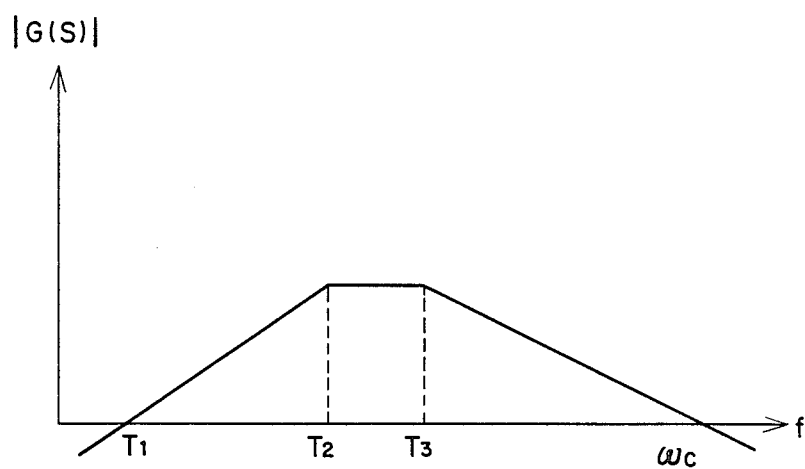
FIG. 5 is a characteristic drawing showing the gain in the filter circuit 26 of the forward power conversion apparatus in the first embodiment of FIG. 2.

The gain characteristic of the phase lagging circuit 16 at this time is as shown in FIG. 5, where "$T_3 = 10$ Hz" and "$\omega_c = 120$ Hz".

The numerator $T_1s$ of the transfer function of the phase lagging circuit 16 operates to remove the D.C. component of the input current $i_1$, while the denominator $(1+T_2s)(1+T_3s)$ operates as a phase lagging component at 120 Hz.

And, the response of the output voltage control system for the thyristor rectifier 1 is about 1,000 rad, whereas the response of the output current control system of the thyristor rectifier 1 is about 200 rad.

Through the above described arrangement, the 120 Hz component $i_1$ of the input current to the inverter 11 is delayed by virtually 90° and turned into $V_1$ by being passed through the phase lagging circuit 16 as shown in the vector diagram of FIG. 4, and further phase-inverted into $v_{cref}$ and applied to the first voltage control circuit 9. Since the first voltage control circuit 9 has a very high speed response, the thyristor rectifier 1 outputs voltage $V_c$ of 120 Hz component lagging by only a very slight angle $\alpha°$ from $v_{cref}$. Assuming that the resistance portion of the D.C. reactor 2 is sufficiently low, a current $i_2$ lagging by 90° from the output voltage $v_c$ flows through the D.C. reactor 2. Since this current $i_2$ is virtually in phase with the input current $i_1$ as shown in FIG. 4, it becomes possible to supply all of the 120 Hz component of the input current $i_1$ to the inverter 11 from the thyristor rectifier 1 by adjusting the gain K in the cancellation value adjusting circuit 17, and thereby passing of the 120 Hz pulsating componentent through the capacitor 12 or the storage battery 3 can be avoided. As a result, only the input current component to the inverter 11 of the harmonics of 240 Hz or above and the output ripple component of the thyristor rectifier 1 pass through the capacitor 12, and therefore, no trouble is produced if the capacrtance of the capacitor is made smaller and it becomes possible to use a film capacitor instead of an electrolytic capacitor.

Figure 6:
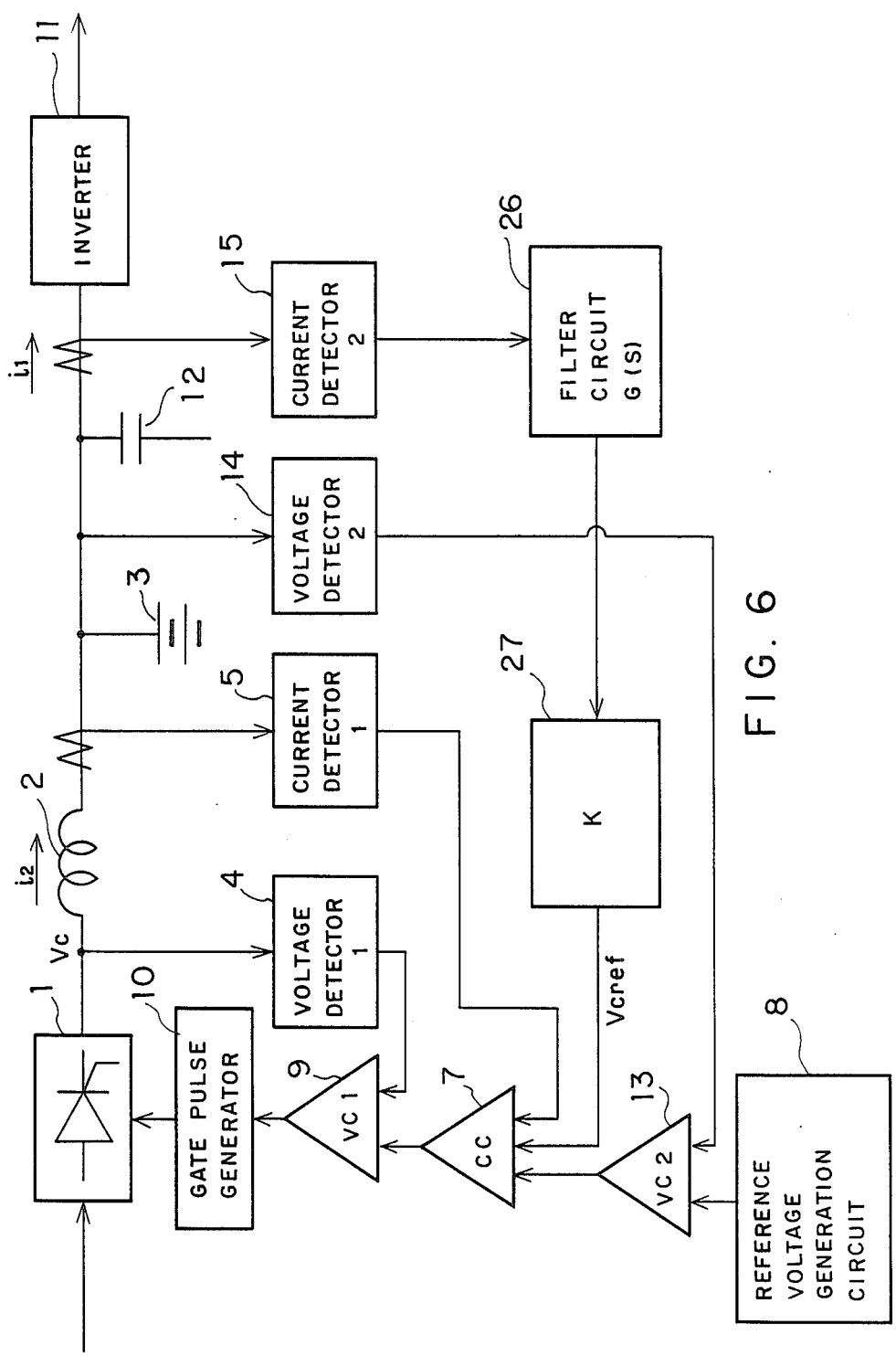
FIG. 6 is a block diagram showing a second embodiment of the D.C. power supply apparatus for an inverter according to the present invention.

In the above described first embodiment, the ripple component of the input current to the inverter 11 is not fed back to the current control circuit 7, but given as feedforward signal to the first voltage control circuit 9, because the current control circuit 7 has only 200 rad/sec or so of response and is unable to respond to 120 Hz. Even so, as shown in the second embodiment of FIG. 6, the pulsating component of the input current $i_1$ to the inverter 11 detected by the second current detector 15 may be supplied through a filter circuit 26 having an appropriate phase characteristic and a cancellation value adjusting circuit 27 to the current control circuit 7 as an input signal, and thereby, it is enabled to have the current $i_2$ in phase with the pulsating component in the input current $i_1$ supplied from the thyristor rectifier 1. In this case, with the phase lag at 120 Hz in the current loop is expressed by $\phi_1$, by using as the transfer function G(S), either (a) a transfer function having an advancing characteristic at 120 Hz by $\phi_1$ or (b) a transfer function having a delaying characteristic by 180°-$\phi_1$ at 120 Hz, followed by a phase inversion of 180°, it is enabled to have the current $i_2$ in phase with the pulsating component in the input current $i_1$ supplied from the thyristor rectifier 1.

If what is described above is considered in a more generalized way, it can be said that a similar effect will be obtained if the signal from the second current detector 15 is passed through an appropriate transfer function before being applied to the first voltage control circuit 9 of the control loop of FIG. 2.

Figure 7:
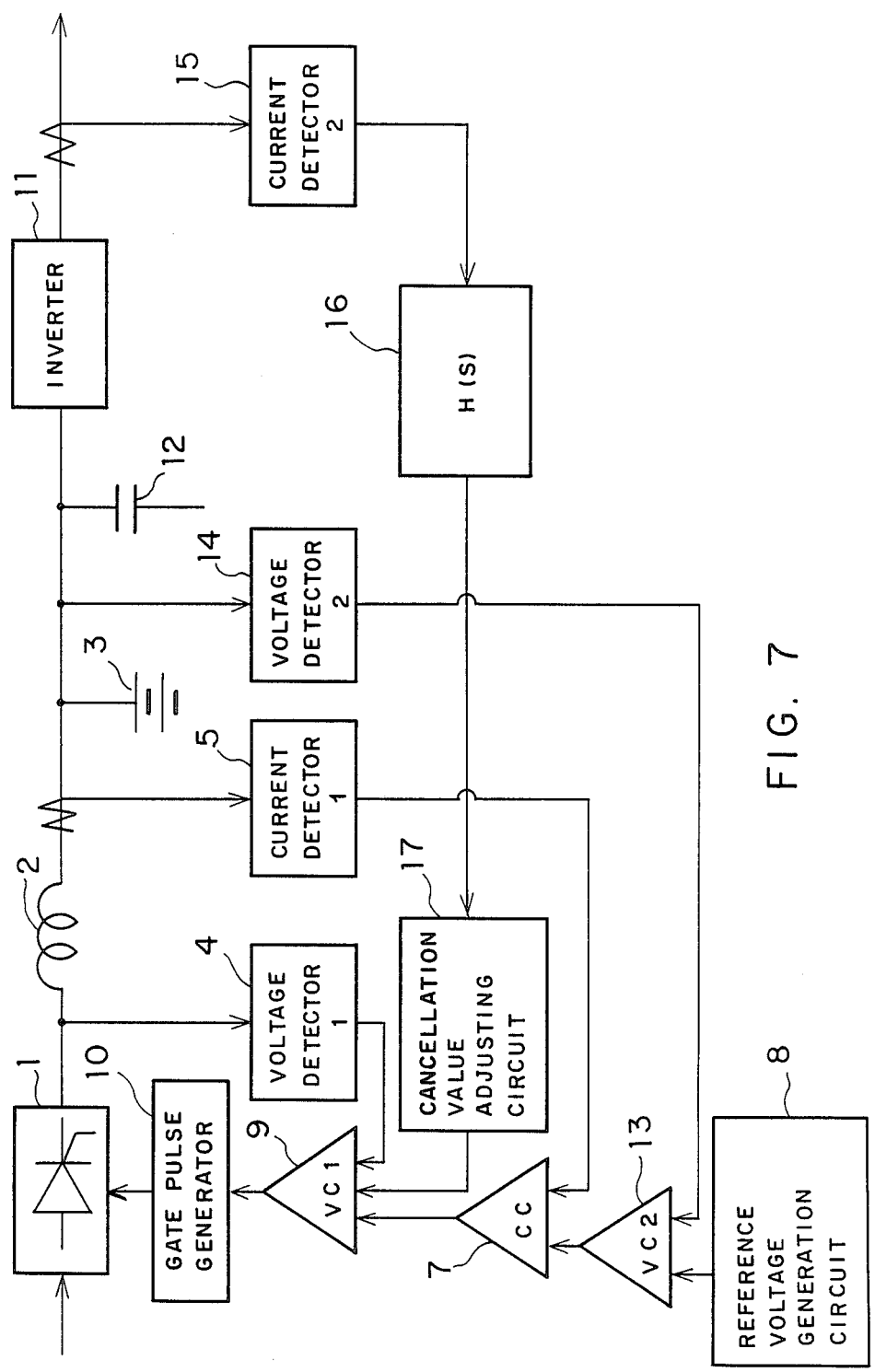
FIG. 7 is a block diagram showing a third embodiment of the D.C. power supply apparatus for an inverter according to the present invention.
Figure 8:
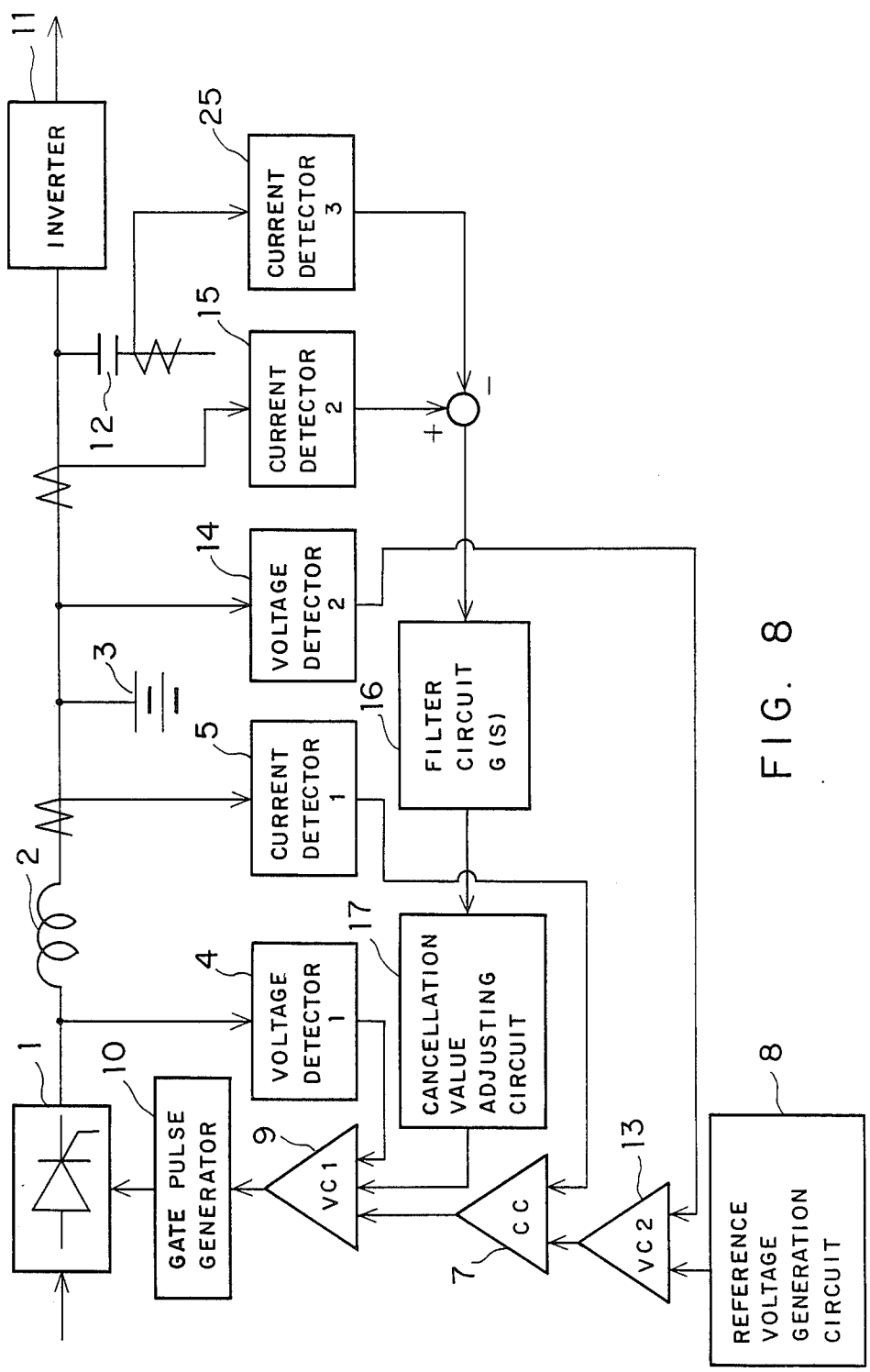
FIG. 8 is a block diagram showing a fourth embodiment of the D.C. power supply apparatus for an inverter according to the present invention.

Although, in the circuit of the above first embodiment detects the input current to the inverter 11 and supplies this input current to the control system for the D.C. power source, the invention may also be practiced, as shown in the third embodiment of FIG. 7, to detect the output current of the inverter 11 instead of detecting the input current to the inverter 11 and synchronously rectify the same based on the switching signal for the inverter thereby to obtain a signal equivalent to the input current to the inverter 11 and supply this to the control system for the D.C. power source. It may further be practicable, as shown in the fourth embodiment of FIG. 8, that the current or voltage is detected through the capacitor 12 provided in the D.C. circuit for the inverter 11 by a third current detector 25, and a signal equivalent to the input current to the inverter 11 can be detected based on the above detected signal and the output current of the D.C. power source. Reference numerals in the second to fourth embodiments of FIGS. 6 to 8 corresponding to those in the first embodiment of FIG. 2 denote same or corresponding parts.

Although, in the first to fourth embodiments described above, the D.C. power source was described as that provided by the thyristor rectifier 1, of course, the present invention is applicable to any type of D.C. power sources, such as chopper circuit, DC/DC converter, and high power factor converter.

According to the D.C. power supply apparatus for an inverter according to the present invention as described above in detail, it is arranged that the D.C. current input to the inverter is detected and this detected signal is supplied as a feedforward signal to a control apparatus controlling the output voltage of a forward power conversion apparatus such as a thyristor rectifier thereby to respond quickly to the input current ripple of the inverter, and therefore, the ripple in the D.C. voltage can be reduced. And thus, the smoothing capacitor connected in parallel with the D.C. circuit and the inverter can be exchanged for such long-life and low-cost type as, for example, a so-called film capacitor and improvement in efficiency of maintenance work and reduction in maintenance cost can be achieved.

By virtue of the suppressed ripple in the D.C voltage, a current ripple is prevented from flowing into a battery even if a smaller capacitance is used, and thereby, deterioration or damage in the battery due to a temperature rise therein can be prevented.

Further, since the need for complex circuit configuration to achieve reduction of the ripple in the D.C. voltage and prevention of deterioration of the battery is eliminated, simplification of the circuit configuration can be achieved.

Besides, even if only a capacitor of small capacitance is used, the increase in the impedance of the D.C. power source can be prevented, and therefore, a D.C. power supply apparatus for an inverter, specifically, that for a three-phase inverter for an unbalanced load can be provided.

What is claimed is:

1. A D.C. (direct current) power supply apparatus for an inverter comprising:
    forward power conversion means for supplying the inverter,
    output voltage control means for controlling the output voltage of said forward power conversion means; and
    feedforward control means connected between the input side of said inverter and said voltage control means for detecting the D.C. input current to said inverter and providing control, based on the detected input current, for developing a ripple component in the output of said forward power conversion means in phase with a ripple component contained in the D.C. input current to said inverter.

2. A D.C. power supply apparatus for an inverter according to claim 1, wherein said forward power conversion means is constituted of a thyristor rectifier circuit.

3. A D.C. power supply apparatus for an inverter according to claim 1, wherein
    said output voltage control means comprises a first current detector for detecting the D.C. output current of said forward power conversion means, a current control circuit for controlling the output current value of said forward power conversion means in response to the detected signal detected by said first current detector, a first voltage detector for detecting the output D.C. voltage of said forward power conversion means, a first voltage control circuit for outputting a voltage control signal in response to output signals from each of said first voltage detector, said current control circuit, and said feedforward control means, and a gate pulse generation circuit for outputting a gate pulse of a controlled phase to said forward power conversion means in response to an output signal of said first voltage control circuit.

4. A D.C. power supply apparatus for an inverter according to claim 3, wherein
    said voltage control means includes a second voltage detector for detecting the input D.C. voltage to said inverter, a reference voltage generation circuit for generating a reference voltage to be output by said forward power conversion means, and a second voltage control circuit for making control through comparison of the output signals of said second voltage detector and said reference voltage generation circuit to output a signal to said current control circuit.

5. A D.C. power supply apparatus for an inverter according to claim 3, wherein said feedforward control means is connected to said current control circuit constituting said output voltage control means and outputs a feedforward control signal to said current control circuit based on the input D.C. current to said inverter.

6. A D.C. power supply apparatus for an inverter according to claim 1, wherein said feedforward control means comprises a second current detector for detecting the input current to said inverter, a filter circuit for filtering the detected signal by said second current detector, and a cancellation value adjusting circuit for adjusting the output of said cancellation value adjusting circuit supplied to said output voltage control means based on the output signal of said filter circuit.

7. A D.C. power supply apparatus for an inverter according to claim 6, wherein said filter circuit is constituted of a phase lagging circuit for delaying the phase of the detected signal by said second current detector by a predetermined amount.

8. A D.C. power supply apparatus for an inverter according to claim 7, wherein a third current detector for detecting a D.C. current in a parallel circuit including a smoothing capacitor is provided, and a feedforward control signal of said feedforward control means based on a difference between a signal detected by said second current detector and a signal detected by said third current detector is supplied to said output voltage control means.

9. A D.C. power supply apparatus for an inverter according to claim 3 and further including a smoothing capacitor and a battery connected to the input side of said inverter between said forward power conversion means and said inverter and wherein said feedforward control means includes a second current detector connected to the input side of said inverter between said smoothing capacitor and said inverter.

10. A D.C. power supply apparatus for an inverter according to claim 9 and further including a second voltage detector connected to said input side of said inverter between said battery and said smoothing capacitor.

11. A D.C. power supply apparatus for an inverter comprising:
    forward power conversion means for supplying an inverter; voltage control means for controlling the output voltage of said forward power conversion means; and feedforward control means for detecting the current value of the A.C. output of said inverter and synchronously rectifying this output current based on the switching signal for said inverter to provide a signal equivalent to the input current to said inverter and feeding this equivalent signal to said voltage control means thereby to control the D.C. output of said forward power conversion means for developing a ripple component in the output of said forward power conversion means to compensate for a ripple component in the input to said inverter.

* * * * *

UNITED STATES PATENT AND TRADEMARK OFFICE
CERTIFICATE OF CORRECTION

PATENT NO. : 4,780,802

DATED : October 25, 1988

INVENTOR(S) : Takeshi Miyashita et al.

It is certified that error appears in the above-identified patent and that said Letters Patent is hereby corrected as shown below:

```
Column 3, line 14, after "duced" insert --,--;
          line 15, "a" should be --as--.
Column 5, line 62, "componentent" should be --component--;
          line 68, "capacrtance" should be --capacitance--.
Column 6, line 33, delete "in".
```

Signed and Sealed this

Tenth Day of October, 1989

Attest:

DONALD J. QUIGG

Attesting Officer

Commissioner of Patents and Trademarks